United States Patent

Youngbluth, Jr.

[15] 3,649,907
[45] Mar. 14, 1972

[54] METHOD AND APPARATUS FOR MAPPING THE SENSITIVITY OF THE FACE OF A PHOTODETECTOR SPECIFICALLY A PMT

[72] Inventor: Otto Youngbluth, Jr., Yorktown, Va.

[73] Assignee: The United States of America as represented by the Administrator of the National Aeronautics and Space Administration

[22] Filed: Mar. 11, 1970

[21] Appl. No.: 18,427

[52] U.S. Cl. .......................................................324/20 R
[51] Int. Cl. .........................................................G01r 31/22
[58] Field of Search ...................324/20, 20 CR, 24; 250/207

[56] References Cited

UNITED STATES PATENTS

| | | | |
|---|---|---|---|
| 2,811,890 | 11/1957 | Wadey | 324/20 R |
| 2,597,383 | 5/1952 | Samuel | 324/20 CR |
| 2,765,440 | 10/1956 | Adelman | 324/20 R |

OTHER PUBLICATIONS

IBM Technical Disclosure Bulletin, " Determining End of Phosphor Life in CRT's" by Gaebelein et al., Vol. 9, No. 6, Nov. 1966

Primary Examiner—Rudolph V. Rolinec
Assistant Examiner—R. J. Corcoran
Attorney—Howard J. Osborn, William H. King and G. T. McCoy

[57] ABSTRACT

Apparatus and technique for obtaining color-coded area sensitivity maps of photomultiplier tubes. First and second oscilloscopes are driven in synchronism to produce rasters on their faces. The raster of the first oscilloscope is optically imaged on the face of the photomultiplier tube being checked. The output of the photomultiplier is applied to a detector which produces an output if and only if the output of the photomultiplier is between two voltages set into the detector. The output of the detector intensity modulates the second oscilloscope and a color camera takes a picture of the face of the second oscilloscope through a color filter. Different voltages are set into the detector and the camera takes another picture through a different color filter. This procedure is continued which results in a color-coded area sensitivity map of the photomultiplier tube.

In an alternate embodiment of the invention a color television is used in place of the second oscilloscope, the camera and the color filter. In this embodiment a different detector is needed for each color.

7 Claims, 3 Drawing Figures

INVENTOR.
OTTO YOUNGBLUTH, JR.

METHOD AND APPARATUS FOR MAPPING THE SENSITIVITY OF THE FACE OF A PHOTODETECTOR SPECIFICALLY A PMT

ORIGIN OF THE INVENTION

The invention described herein was made by an employee of the United States and may be manufactured and used by or for the Government for governmental purposes without the payment of any royalties thereon or therefor.

BACKGROUND OF THE INVENTION

The invention relates generally to measuring the area sensitivity of photomultiplier tubes (PMT's) and more specifically concerns apparatus and technique for obtaining color-coded area sensitivity maps of PMT's.

For many space- or earth-oriented experiments that require light detection, researchers depend upon their most sensitive detector—the PMT. Unfortunately, the PMT has certain undesirable characteristics. One of these is a nonuniform area sensitivity (that is, the output at the anode varies with the per-unit-illuminated area of the photocathode). In application such as spectroscopy, radiometry, tracking, and so forth, where light is imaged on the face of the photomultiplier, the anode output can vary as much as 50 percent or more with the location of the image on the detector face. In this case, the greatest portion of uniform area sensitivity of the PMT should be alined with the expected direction of the image motion. In the scintillation field, a preferred area of the PMT face must be selected for placement of the scintillation crystal to insure uniform sensitivity. This preferred area can be located from a map of the PMT area sensitivity. Obtaining such a map is a tedious and time-consuming task; hence, the usual alternative is to assume the area sensitivity to be constant, or to average the nonuniformities with optics. The area sensitivity includes the nonuniformity of the photocathode, the collection efficiency at dynode one and at the anode, and the effects of the electron multiplier. In a PMT with a focus electrode, the user has some control of the area sensitivity. However, this is usually set in accordance with the manufacturer's recommendation. These recommendations vary with the specific PMT and operation and include the following: (1) connect the focus electrode to the cathode, (2) connect the focus electrode to the first dynode, and (3) adjust the focus electrode to obtain maximum anode current. Unfortunately, the recommendations do not include data concerning the variation of the area sensitivity under these conditions.

SUMMARY OF THE INVENTION

This invention provides means for obtaining color-coded area sensitivity maps for PMTs. The mapping technique uses a raster of a scan oscilloscope to scan and illuminate the photocathode. The PMT output is applied to a window voltage detector, and the selected window voltage modulates the brightness of a phase-locked raster of a display oscilloscope. A series of interchangeable color filters (one for each selected window voltage) are used in color coding the photographs of the display raster. The resulting colors, normally six, are used to represent the relative PMT output sensitivity for photons incident on various portions of the photocathode. Each color represents a constant anode output similar to isoelevation lines on a topographical map. This type of presentation, which takes less than 10 minutes, provides the experimenter with quantitative and qualitative information of the sensitivity variations across the sensitive surface of the detector.

The data obtained are useful in analyzing the PMT spectral response characteristics, and in measuring the fatigue and circuit design effects on PMT area sensitivity. Using these data, optical and electrical parameters can be adjusted to tailor the PMT output characteristics for the particular measurement problem. Representative photomultiplier data obtained with this method show that the per-unit area sensitivity across the tube face can vary as much as 50 percent, and that the best uniformity is obtained by adjusting the focus electrode voltage to a level between the photocathode and dynode one.

In an alternate embodiment of the invention a color television is used in place of the display oscilloscope, the color filter and the color camera. With the use of a color television display, a full color picture can be obtained in one raster (one frame); thus, only a single exposure is made instead of the multiple exposure of the film in the other embodiment.

DETAILED DESCRIPTION OF THE INVENTION

Figure 1:
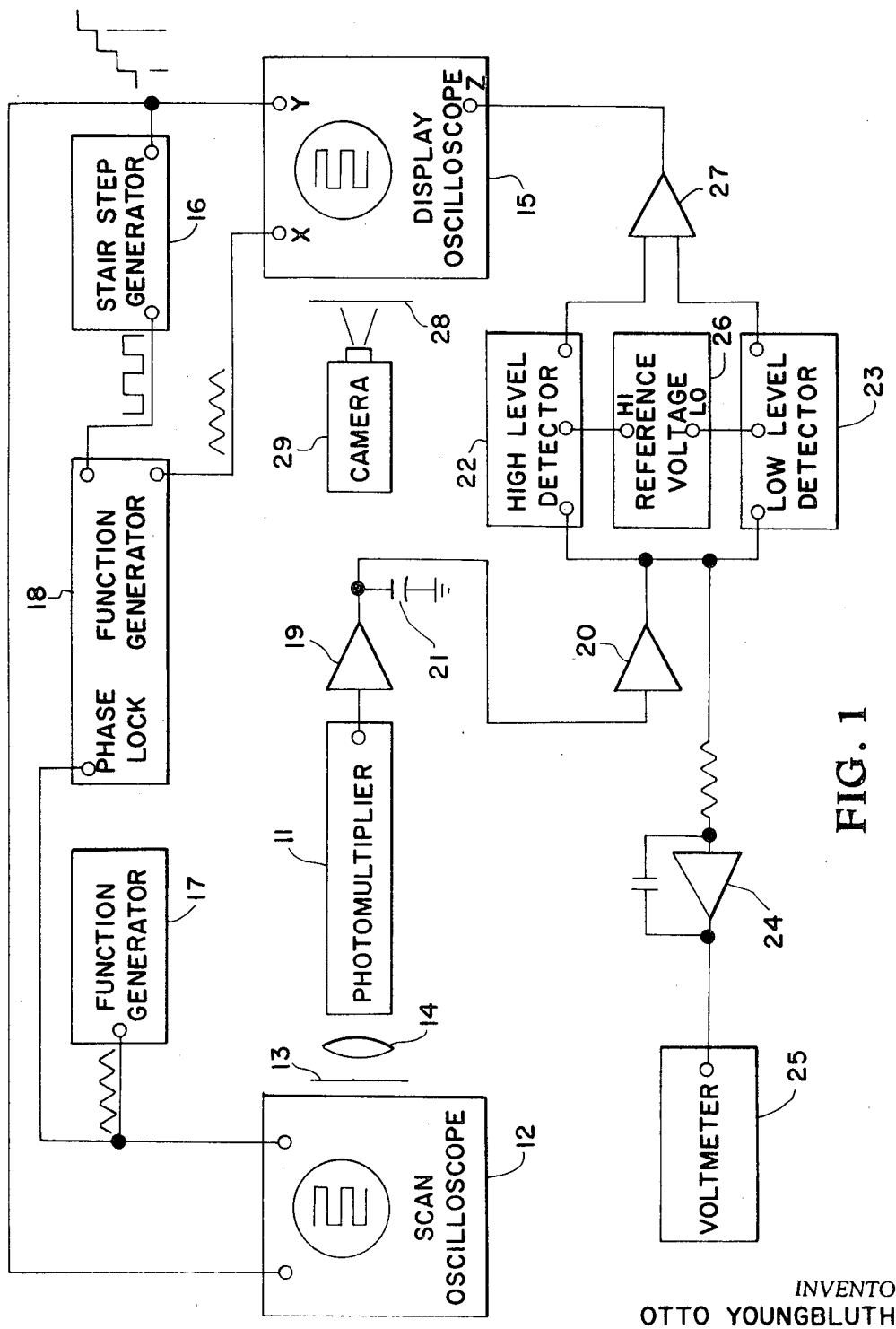
FIG. 1 is a block diagram of a preferred embodiment of the invention.

Turning now to an embodiment of the invention selected for illustration in the drawings the number 11 in FIG. 1 designates the photomultiplier whose sensitivity is to be mapped. An oscilloscope 12 is driven to obtain a raster on the face of its cathode-ray tube (CRT). This raster is imaged on the face of photomultiplier 11 by a lens 14 through a blue filter 13. Blue filter 13 is used to minimize the persistence effect. The y-axis of oscilloscope 12 and the y-axis of an oscilloscope 15 are driven by a 15-hertz stairstep waveform generator 16. The x-axis of oscilloscope 12 is driven by a 15-hertz triangular wave from a function generator 17 and the x-axis of oscilloscope 15 is driven by a 15-hertz triangular wave from function generator 18. These two triangular wave signals are identical except that the one generated by function generator 18 is adjusted with a phase lock unit to compensate for phase shifting. Most of the phase shift at frequencies in the 15-hertz range can be eliminated by using a short decaY phosphor with oscilloscope 12.

The output of photomultiplier 11 is amplified by DC amplifiers 19 and 20, and filtered by a capacitor 21. The output of amplifier 20 is applied to a high-level detector 22 and a low-level detector 23. The output of amplifier 20 is also integrated by an integrator 24 and the resulting voltage is measured by a voltmeter 25. Detectors 22 and 23 have different reference voltages applied to them from the reference voltage source 26. The reference voltage applied to detector 22 is higher than the reference voltage applied to detector 23. These two detectors are identical and each will produce one voltage if its input voltage is higher than its reference voltage and will produce another voltage if its input voltage is lower than its reference voltage. The outputs of detectors 22 and 23 are applied to a difference amplifier 27 whose output is applied to the z-axis of oscilloscope 15 to intensity modulate the raster pattern. There is a voltage applied to the z-axis of oscilloscope 15 only while the voltage at the output of amplifier 20 is at a level between the reference voltage applied to detector 22 and the reference voltage applied to detector 23. If the voltage at the output of amplifier 20 is higher or lower than both reference voltages no voltage is applied to the z-axis of oscilloscope 15 since the outputs of the two detectors are the same and are cancelled by difference amplifier 27.

The time that difference amplifier 27 produces a voltage represents the area of the face of photomultiplier 11 that has a sensitivity greater than that corresponding to the reference voltage applied to detector 23 and less than that corresponding to the reference voltage applied to detector 22. The resulting lighted area on oscilloscope 15 represents the area on the face of photomultiplier having a sensitivity in the range defined by the two reference voltages. This lighted area is photographed through a color filter 28 by a multiexposure color camera 29. For each set of reference voltages applied to detectors 22 and 23 a different colored filter 28 is used. Hence, camera 29 produces a multicolored picture with the area of each color representing the area of the face of photomultiplier 11 having a sensitivity corresponding to that color.

Figure 2:
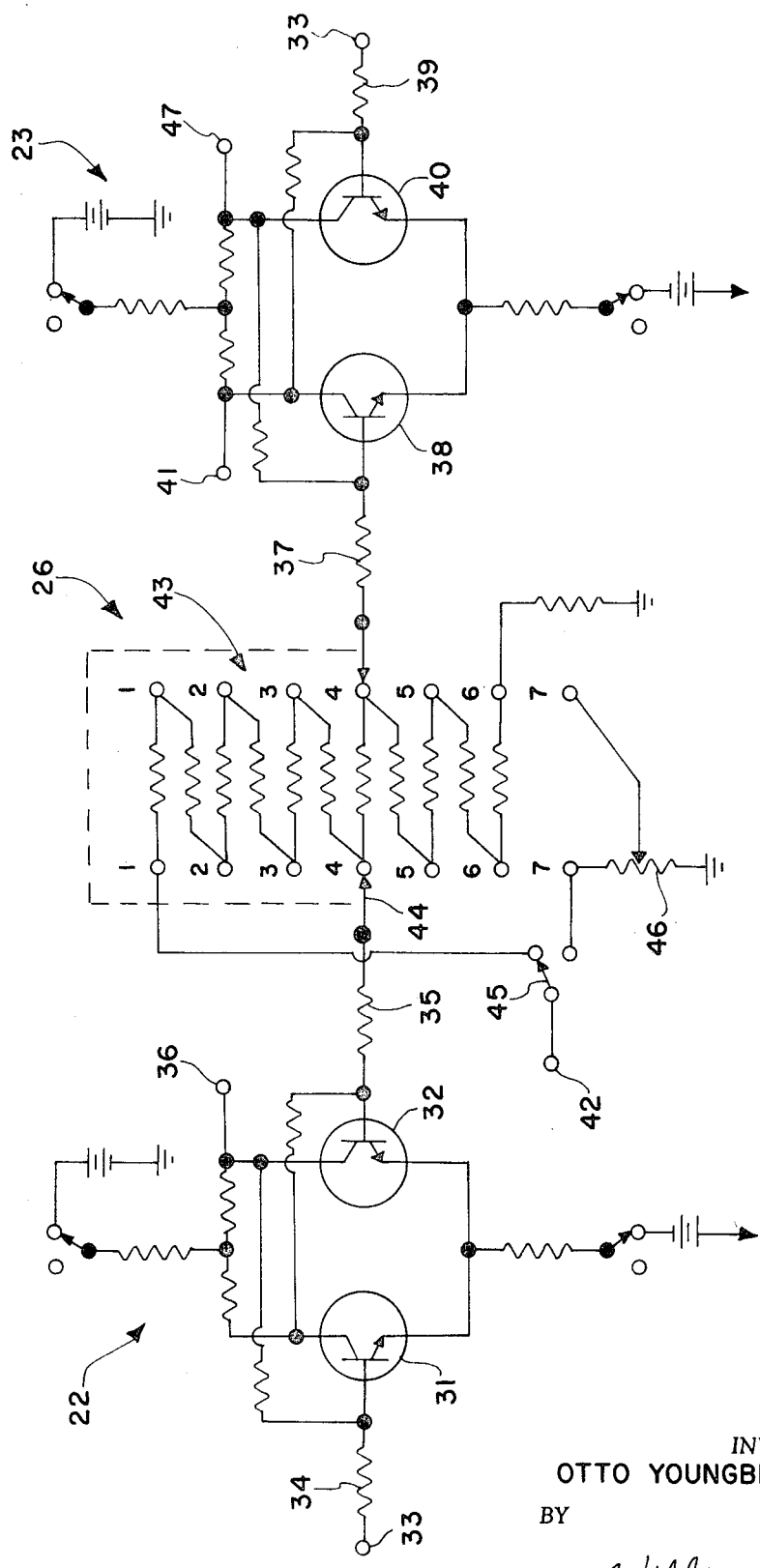
FIG. 2 is a schematic drawing of the high- and low-level detectors, and the reference voltage source in FIG. 1.

In FIG. 2 there is shown a schematic diagram suitable for use as high-level detector 22, low-level detector 23 and reference voltage source 26. High-level detector 22 consists of transistors 31 and 32, and their associated circuitry. The output from amplifier 20 is applied through terminal 33 and resistor 34 to the base of transistor 31, and the high reference voltage from source 26 is applied through a resistor 35 to the base of transistor 32. If the voltage at terminal 33 is greater than the high reference voltage then transistor 31 is conductive and transistor 32 is nonconductive causing a first voltage level to be produced at terminal 36; and if the voltage at terminal 33 is less than the low reference voltage then transistor 31 is nonconductive and transistor 32 is conductive causing a second voltage level to be produced at terminal 36. Detector 23 is identical to detector 22 except that the low reference voltage is applied through a resistor 37 to the base of a transistor 38. The output of amplifier 20 is applied through a resistor 39 to the base of a transistor 40. The output of detector 23 is terminal 41. Terminals 36 and 41 are connected to difference amplifier 27. Reference voltage source 26 consists of a reference voltage applied to terminal 42, a bank of resistors 43 connected in series and to the reference voltage, and a switch 44 for selecting one of the resistors in bank 43 to connect it between transistors 32 and 38. For each setting of switch 44 a voltage difference at a different level is selected. An alternative reference voltage source 26 is switch 45 in its other position so that reference voltage 42 is connected across potentiometer 46 with switch 44 connected to the "7" terminals.

In the operation of this invention oscilloscopes 12 and 15 are turned on and they are driven by function generators 16, 17 and 18 to obtain a raster on the face of each CRT. Reference voltage source is then set to apply selected voltages to detectors 22 and 23. This can be done by placing the movable contacts of switch 44 on fixed contacts "1." Then a filter 28 having a color selected to represent the level of the voltages applied to the detectors is placed between the CRT of oscilloscope 15 and camera 29 which then takes the picture. Inasmuch as the only area on the face of the CRT that is lighted is that area corresponding to the area on the face of photomultiplier 11 that has a sensitivity represented by the difference in voltages applied to the detectors, the picture taken by the camera is only that area. This procedure is continued for different settings of the reference voltage source 26 and corresponding different color filters 28. The resulting composite picture taken by camera 29 is a multicolored picture with the area of each color denoting a specific sensitivity for the corresponding area on the face of photomultiplier 11.

Figure 3:
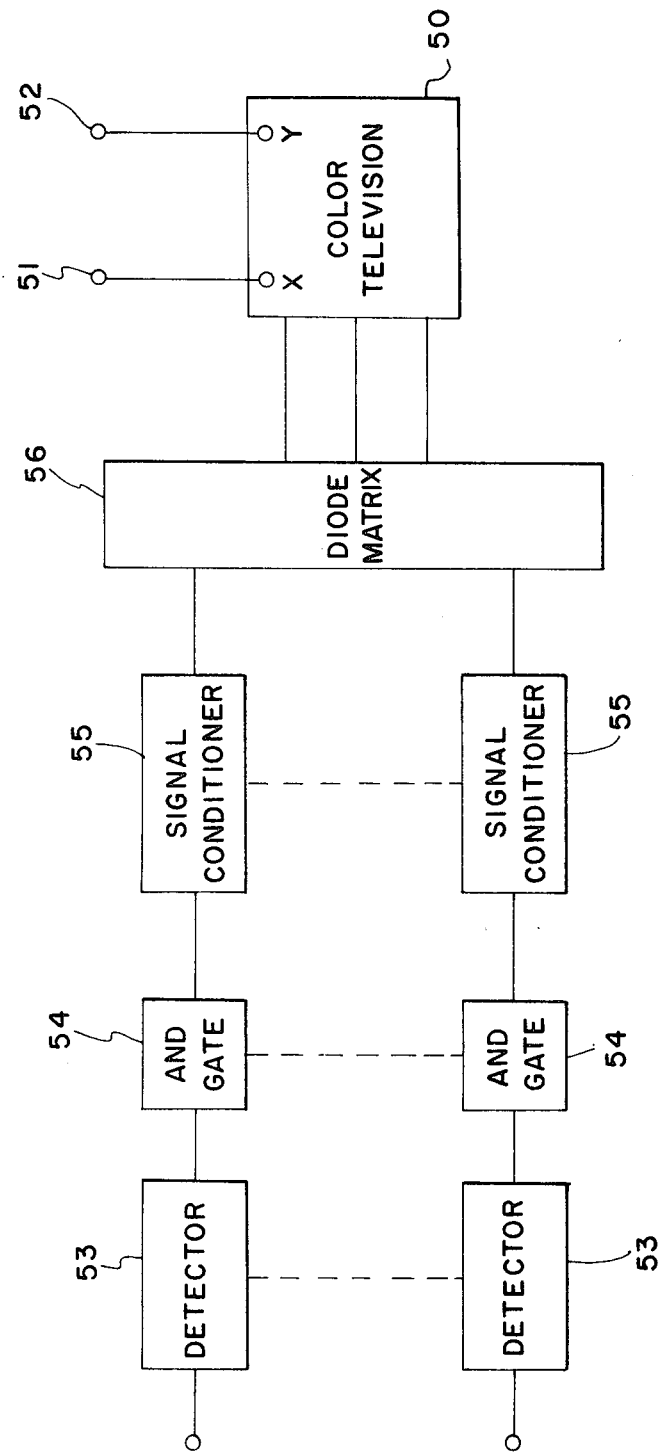
FIG. 3 is a block diagram disclosing an alternate embodiment of the invention.

In the alternate embodiment of the invention disclosed in FIG. 3, a color television 50 is used in place of display oscilloscope 15 in FIG. 1. That is, the x-axis (terminal 51) of color television 50 is connected to function generator 18 and the y-axis (terminal 52) is connected to stairstep generator 16. Each of the detectors 53 includes a high-level detector 22, a low-level detector 23 and a reference voltage source 26. A different detector 53 is used for each color that is displayed on the screen of color television 50. Terminal 36 of high-level detector 22 and terminal 47 of low-level detector 23 in each detector 53 are applied to an AND-gate 54. Signal conditioner 55 changes the polarity of signal at the output of AND-gate 54, improves the shape of this signal, provides gain control, and provides individual color intensity control. The outputs from all signal conditions 55 are applied to a diode matrix 56 having three outputs: one output supplies the blue gun and the other output supplies the green gun. Hence, the combination of the color guns of television 50 that are activated at any given time depends on the signal conditioners 55 that is producing a signal at that time. AND gates, signal conditioners and diode matrices are well known devices and hence are not disclosed in detail in this application.

In the operation of the alternate embodiment of the invention a raster is produced on the faces of scan oscilloscope 12 and color television 50. The raster on oscilloscope 12 is imaged on photomultiplier 11 and the resulting output from amplifier 20 is applied to all detectors 53. Each detector 53 has high and low reference voltages applied to it. As the raster scans across the face of photomultiplier 11 the output of amplifier 20 changes due to the nonuniform sensitivity of photomultiplier 11. If at any given time the voltage at the output of amplifier 20 is between the high and low reference voltages of detector 53 the associated AND-gate 54 produces a signal which is conditioned by the corresponding signal conditioner 55 and then applied to diode matrix 53. This signal applied to diode matrix 53 will activate one or more of the color guns of televisions 50 to produce the color on its screen associated with the interval between the high and low reference voltages. Hence, the raster on photomultiplier 11 produces a color-coded contour map on color television 50 that is indicative of the sensitivity of the face of the photomultiplier 11.

The advantages of this invention is that it provides color contour maps so that an experiment can study various effects upon the area sensitivity of PMTs. These include such effects as fatigue, wavelength, focus electrode configuration and voltage, compensating transmission filters, resistor divider networks, diffusing glasses, and so forth. With the capability of readily determining the PMT area sensitivity and how it can be varied, the experimenter can use these devices in a manner that has been previously impractical.

It is to be understood that the form of the invention herewith shown and described is to be taken as a preferred embodiment. Although the preferred embodiment only includes maps of PMT's, it can be easily modified to obtain maps of other photodetectors.

What is claimed as new and desired to be secured by Letters Patent of the United States is:

1. Apparatus for mapping the sensitivity of the face of a photodetector comprising: first and second oscilloscopes; means for driving said first and second oscilloscopes to obtain synchronized rasters on their faces; means for optically imaging the raster on the face of said first oscilloscope on the face of said photodetector; detector means, having first and second voltages set into it, connected to the output of said photodetector for producing a voltage if, and only if, the output of said photodetector after amplification is between said first and second voltages; and means for connecting the output of said detector means to said second oscilloscope to intensity modulate the raster on its face whereby the modulated area of the raster on the face of said second oscilloscope corresponds to the area on the face of said photodetector having a sensitivity determined by said first and second voltages.

2. Apparatus according to claim 1 including a color camera for taking a picture of the face of said second oscilloscope and a colored filter located between said camera and the face of said second oscilloscope whereby the picture taken by said camera is a colored area corresponding to the area of sensitivity on the face of said photodetector represented by the color of said colored filter.

3. Apparatus according to claim 2 wherein said detector means includes means for changing said first and second voltages, said colored filter is interchangeable with other colored filters, and said camera is a multiexposure camera whereby a color-coded contour sensitivity mapping of the face of said photodetector can be made.

4. Apparatus according to claim 1 wherein said detector means includes a first circuit connected to said first voltage for producing a third voltage while the output of said photodetector exceeds said first voltage and for producing a fourth voltage while said first voltage exceeds the output of said photodetector; a second circuit connected to said second voltage for producing said third voltage while the output of said photodetector exceeds said second voltage and for producing said fourth voltage while said second voltage exceeds the output of said photodetector; and a difference amplifier connected to the outputs of said first and second circuits whereby said difference amplifier produces an output if and only if the output of said photodetector is at a level between said first and second voltages.

5. Apparatus for mapping the sensitivity of the face of a photodetector comprising: an oscilloscope; a color television; means for driving said oscilloscope and said color television to obtain synchronized rasters on their faces; means for optically imaging the raster on the face of said oscilloscope on the face of said photodetector; a plurality of detector means with each having first and second voltages set into it and connected to the output of said photodetector for producing a voltage if and only if the output of said photodetector after amplification is between said first and second voltages; and means for connecting the outputs from said plurality of detector means to said color television to produce a different color for each detector means that produces an output signal whereby said color television produces a color-coded mapping of the sensitivity of the face of said photodetector.

6. Method for mapping the sensitivity of the face of a photodetector comprising the steps of: driving first and second oscilloscopes to obtain synchronized rasters on their faces; optically imaging the raster on the face of said first oscilloscope on the face of said photodetector; producing a voltage if and only if the resulting output of said photodetector is between two preselected values; intensity modulating the raster on the face of second oscilloscope with said produced voltage; and taking a picture of the face of said second oscilloscope through a colored filter whereby the picture taken is a colored area corresponding to the area of sensitivity on the face of said photodetector represented by the color of said colored filter.

7. Method according to claim 6 including the additional step of changing said two preselected values and the color of said colored filter to obtain a multicolored picture.

* * * * *